United States Patent [19]

Farrer

[11] 4,301,498
[45] Nov. 17, 1981

[54] VOLTAGE CONVERTER APPARATUS HAVING OUTPUT REGULATING MEANS

[75] Inventor: Michael Farrer, Linton, England

[73] Assignee: Gould Advance Limited, Essex, England

[21] Appl. No.: 90,030

[22] Filed: Oct. 31, 1979

[51] Int. Cl.³ .......................................... H02M 3/335
[52] U.S. Cl. ...................................... 363/25; 363/90; 363/97
[58] Field of Search ................................. 363/22-26, 363/74, 78, 80, 86, 90, 91, 97, 98, 132, 133

[56] References Cited

U.S. PATENT DOCUMENTS

| | | | |
|---|---|---|---|
| 3,388,311 | 6/1968 | de la Lastra | 363/74 |
| 3,663,940 | 5/1972 | Schwarz | 363/23 X |
| 3,938,024 | 2/1976 | Clarke | 363/23 |
| 4,164,014 | 8/1979 | Crowe et al. | 363/49 |
| 4,199,807 | 4/1980 | Crowe et al. | 363/98 X |

FOREIGN PATENT DOCUMENTS

| | | |
|---|---|---|
| 2643796 | 3/1978 | Fed. Rep. of Germany ........ 363/22 |
| 956948 | 4/1964 | United Kingdom . |
| 1315872 | 5/1973 | United Kingdom . |
| 1325031 | 8/1973 | United Kingdom . |
| 1459885 | 12/1976 | United Kingdom . |
| 1531313 | 11/1978 | United Kingdom . |

Primary Examiner—A. D. Pellinen
Attorney, Agent, or Firm—Laubscher, Philpitt & Laubscher

[57] ABSTRACT

Voltage converter apparatus is disclosed having circuitry for regulating the output voltage to maintain it at a regulated value. Use is made of switching devices that switch between their alternative states in a cyclic manner and at a particular frequency which is determined by the circuit constants. An inductance is provided for modifying the waveform of the current fed to the output transformer, so that at certain periods of the cycle there is a lesser contribution to the integrated output—i.e., the output is not a true 1:1 square wave. Then, by changing the switching intervals, the integrated output can be controlled. A current transformer is provided for sensing current changes occurring in the output transformer, and a short circuit arrangement is provided for short circuiting a control winding of the converting transformer to control the instants of switching of the switching devices.

10 Claims, 4 Drawing Figures

VOLTAGE CONVERTER APPARATUS HAVING OUTPUT REGULATING MEANS

BACKGROUND OF THE INVENTION

This invention relates to electric power supply apparatus of a type in which by means of semiconductor devices a first unidirectional input voltage is switched so as to reverse its polarity at a relatively high freqeuncy. The switched voltage is fed to a transformer the output of which is rectified to produce a second unidirectional output voltage, usually differing from the input voltage. Such a system is usually referred to as a voltage converter, and will be so called in this specification. The unidirectional input to the converter may itself be obtained by rectification of an alternating current supply.

Voltage converters of the above type are known, see for example U.S. Pat. to Crowe et al No. 4,164,014 which discloses what are known as half-bridge and push-pull converters and U.K. Pat. No. 1,459,885 which discloses what is known as a full-bridge converter. Although these inverters have been known for some little time, it has proved difficult to provide a regulated output from them. This has usually meant that if a regulated output was required it was necessary to supply the converter with a regulated input, or to use a very crude form of control known as burst-fire control by switching the converter off and on at intervals so that over a long period of time the output could be considered stable. Such a control system is disclosed in the above-mentioned British Pat. No. 1,459,885.

SUMMARY ON THE INVENTION

The invention has for its object ot provide an improved voltage converter which includes means for regulating the output voltage to maintain it at a regulated value, substantially independent of changes of the unidirectional input voltage and of the load conditions on the output of the converter.

According to the present invention there is provided a voltage converter comprising a source of a first unidirectional voltage, switching means for applying said first unidirectional voltage alternately in opposite polarities to a primary winding of a transformer, an inductance connected in series with said primary winding, and means for rectifying an alternating voltage appearing on a secondary winding of the transformer to develop an output at a second unidirectional voltage, wherein said switching means comprises two transistors each having a respective drive winding of the transformer connected between its base and emitter, said transformer having a third winding connected in series with said primary winding so that load currents drawn from said output and reflected into the converter transformer primary circuit cause an increase in the current in the drive winding of the conductive transistor, and wherein the inverter transformer is provided with a further winding connected to further switching means for shorting the further winding whereby to control the frequency of switching of the transistors.

BRIEF DESCRIPTION OF THE DRAWINGS

Features and advantages of the invention will appear from the following description of an embodiment thereof, given by way of example, and the accompanying drawings, in which:-

DETAILED DESCRIPTION

Figure 1:
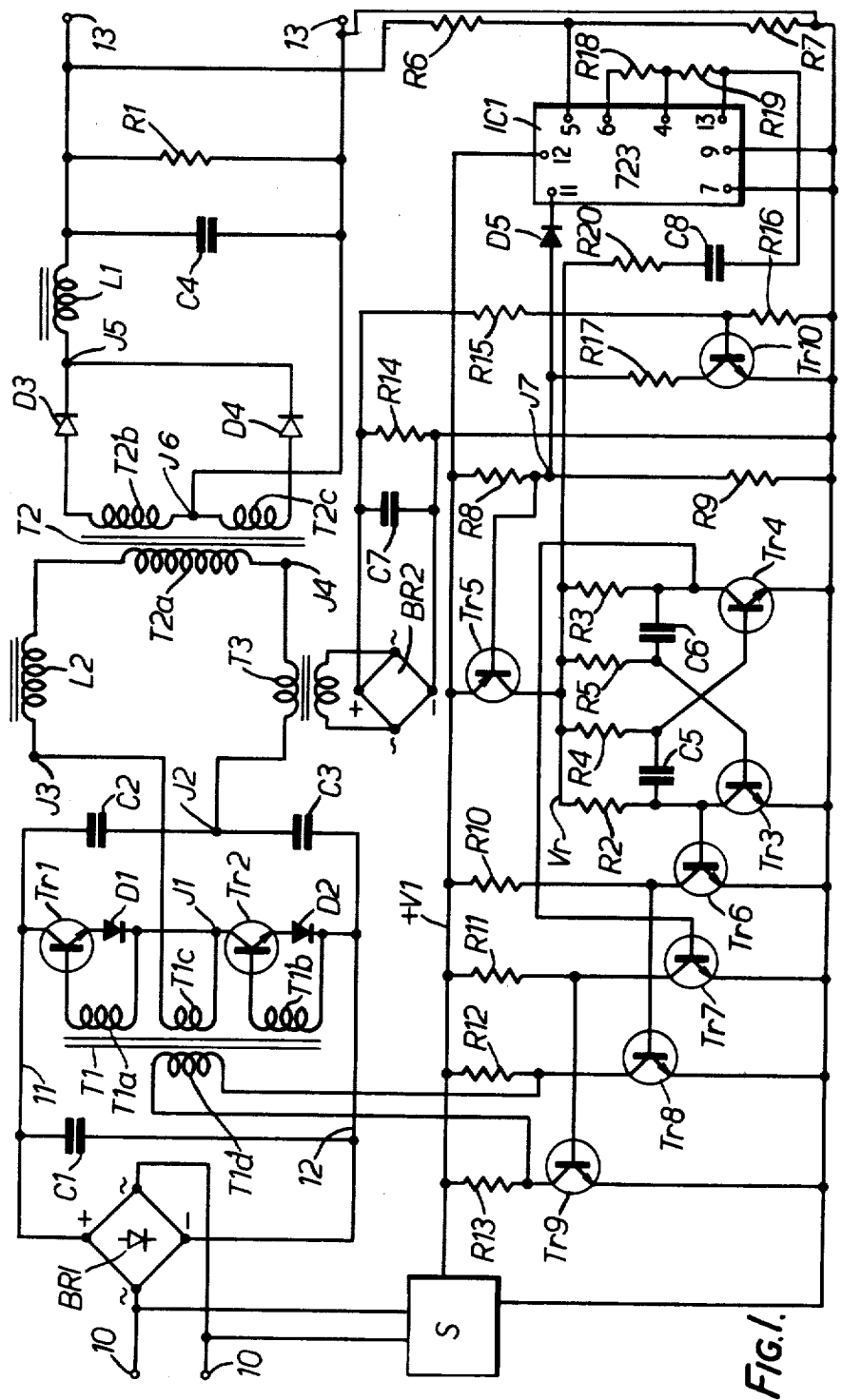
FIG. 1 is a circuit diagram partly in block form of a volage converter.

In the voltage converter shown in FIG. 1, an alternating current supply, which may be of conventional supply voltage and frequency (240v, 50 HZ), is applied to input terminals 10 and by means of bridge rectifier BR1 and filter capacitor C1, produces a first unidirectional voltage between conductors 11 and 12. Between these conductors is connected a series combination of two unidirectional transistor switching devices, joined at a junction point J1. The switching devices are formed by transistor Tr1,Tr2 each in series with a respective diode D1, D2. A saturable transformer T1 has a first secondary winding T1a connected between the base of transistor Tr1 and the common junction point J1 of the transistor and switches a second secondary winding T1B connected between the base of transistor Tr2 and the negative conductors 12. Also shunted between conductors 11 and 12 is the series combination of two further capacitors C2 and C3, having a junction point J2. In a manner to be described, voltages appearing between points J1 and J2 are fed to the primary winding T2a of a transformer T2.

Junction point J1 is connected to one end of winding T2a by way of the primary winding of a transformer T1c and by way of an inductor L2 while junction point J2 is connected to the other end of winding T2a by way of the primary winding of transformer T3. Transformer T2 has two series-connected secondary windings T2b and T2c and the voltage appearing across these windings is rectified by a rectifier, comprising in this embodiment diodes D3 and D4, and is filtered by a filter comprising an inductor L1 and capacitor C4, the latter being shunted by a bleed resistor R1. The filtered unidirectional output appears at output terminals 13.

Transformer T1 operates in conjunction with transistors Tr1 and Tr2 to produce periodic reversals of the voltage applied to the primary winding T2a of transformer T2 and the rectified and filtered output feeds any load circuit connected to terminals 13. When current is drawn from terminals 14, a load is reflected back to the primary winding of transformer T2 and must be provided by that one of the two transistors Tr1, Tr2 which is then supplying current. If transistor Tr1 is conductive, additional base current will be induced in winding T1a, due to the flow of current in winding T1c which, being in series with winding T2a, carries the reflected load current. The transformer T1 is designed to saturate in operation, and the transformer will be driven to the point of saturation by the progressively increasing current in winding T1a due to the constant voltage drop presented by the base emitter voltage Vbe of transistor Tr1 together with the forward voltage drop Vf of diode D1. When, due to this saturation, the voltage of winding T1a is insufficient to overcome the voltage (Vbe+Vf) the transistor will be turned off.

When transistor Tr1 turns off, the rate of change of flux in the core of transformer T1 reverses and this flux change induces in winding T1b a voltage in a sense to cause transistor Tr2 to conduct. The current passed by transistor Tr2 flows through the winding T2a of transformer T2 in a direction producing a flux opposite to the current of transistor Tr1.

The time now taken to saturate transformer T1 depends on the base-emitter voltage drop of transistor Tr2 and the forward voltage drop of D2. When saturation occurs, transistor Tr2 ceases to conduct in a manner similar to transistor Tr1.

The converter thus far described has the ddisadvantage that the output voltage appearing at terminals 13 is sensitive both to the load applied to those terminals and also to the input voltage applied to terminals 10 and therefore means are provided to reduce such output voltage changes.

The method of control of output which is provided in a converter embodying the invention is based on the fact that the transistors Tr1 and Tr2 will switch between their alternative states in a cyclic manner and at a particular frequency which is determined by the circuit constants. Further, it can be arranged that the waveform of the pulses which are applied to the primary winding T2a of transformer T2 are such that at certain periods of the cycle there is a lesser contribution to the integrated output from the transformer, that is, that the output is not a true 1:1 square wave. Then, by changing the switching intervals, the integrated output can be controlled.

The above description of FIG. 1 has made no reference to the functions of the inductor L2, of the transformer T3, or of a further winding T1d on transformer T1. Briefly, inductor L2 modifies the waveform of the current fed to transformer T2, transformer T3 senses current changes occurring in transformer T2 and suitable processing means applied to winding T1d a signal which controls the instants of switching of transistors Tr1 and Tr2.

Consider first the operation of inductor L2. If a potential difference is applied instantaneously between the points J3 and J4 which form the ends of the series combination of the inductor L2 and primary winding T2a of transformer T2, and equal and opposite back e.m.f. is generated, substantially all of this e.m.f. appearing across the inductor, so that a negligible voltage is applied to the winding T2a, while the current in L2 rises progressively. This condition will continue until the rising current in the inductor reaches the value of the load current reflected into winding T2a from the windings T2b and T2c. When this point is reached, the current through inductor L2 ceases to change and therefore the back e.m.f. collapses and the voltage across the inductor diminishes to a low value. At this time, substantially the whole of the voltage appearing at points J3, J4, is applied to the winding T2a. By normal transformer action, voltages are produced in windings T2b and T2c and these are rectified and smoothed by the filter L1 and C4, to supply the load at terminals 13. The output voltage is proportional to the time integral of the voltage applied to the filter input points J5, J6 because of the integrating effect of the filter.

If the output load current should increase then the current through inductor L1 will increase proportionally but the rate of rise of current is constant so that, for a given width of voltage pulse appearing at terminals J3, J4, the time taken for the current to rise to a value equal to the reflected current in winding T2a will increase. Thus, if the load current increases the voltage-time integral at terminals J5 and J6, at the output of the rectifiers D3, D4 will decrease. Conversely, for a decrease in load current the voltage time integral at terminals J5, J6 will increase.

Figure 2:
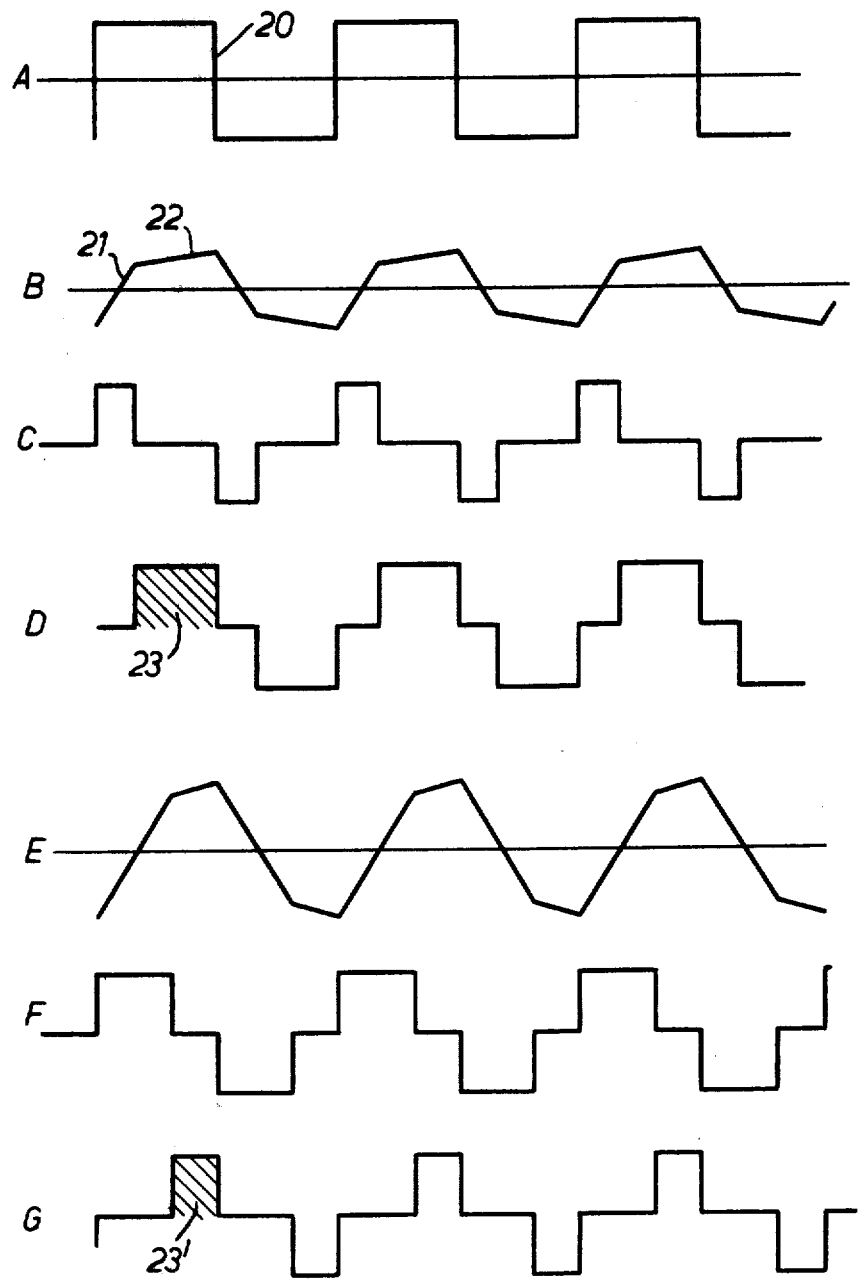
FIGS. 2 to 4 are waveform diagrams illustrating the operation of the converter shown in FIG. 1.

The operation may be better understood from the waveforms of FIG. 2. FIG. 2A shows the idealized waveform 20 appearing at points J3, J4 and FIG. 2B, the waveform of the current through the inductor L2. The first part 21 of each waveform of FIG. 2B shows a constant rate of change and the second part 22 has a reduced slope which is due to the magnetizing current of the transformer T2. The resulting voltage appearing across the inductor is shown in FIG. 2C and the complementary voltage appearing across the winding T2a is shown in FIG. 2D. The output voltage will be proportional to the voltage time integral represented by the shaded area 23. The waveform of the increased current through the inductor is shown in FIG. 2E and the voltage across the inductor due to the increased current of waveform 2E is shown in FIG. 2F. The shorter pulses which appear across winding T2a in these conditions is indicated in waveform 2G, from which it will be noted that the shaped area 23' representing the time integral has diminished as a result of the increased current.

The above description assumes that the output transformer T2 is substantially free from leakage reactance. It has been found that if the frequency of operation is high enough, even such a transformer starts to exhibit losses due to leakage reactance and these losses can be used to replace the inductor or at least reduce its value. Thus, although an inductor L2 is shown, in practice it may be that there will be no separate inductor in the circuit, the leakage reactance losses of the transformer T2 being sufficient to provide the operation outlined above due to the inductor L2.

Means are provided to vary the frequency of the cyclic operation of the switching stage including transistors Tr1 and Tr2. For this purpose a voltage sensitive oscillator state, controlled by voltage developed from the output voltage appearing at terminals 13, is preferably used. The oscillator advantageously comprises two transistors Tr3 and Tr4 which, with resistors R2 to R5 and capacitors C5 and C6 are cross-connected in a manner which resembles a conventional multivibrator.

Normally, a multivibrator circuit has a frequency of operation which is not especially sensitive to the voltage between the supply conductors, but with this circuit this is not the case. With a conventional multivibrator, if the supply conductor voltage is Vr, as indicated in FIG. 1, the aiming voltage of the time constant circuits consisting of R4 and C5, and R5 and C6 is approximately twice Vr and when a voltage of Vr is reached transition between states of the two transistors occurs. In this type of operation the time constant is 0.69 CR. However, in the circuit described the aiming voltage of the time constant circuits is (Vr+Vbe) and the transition point of the transistors Tr3 and Tr4 is reached when the voltage value of 2 Vbe is attained. Accordingly, the transition point is dependent upon the value of Vr, a higher value of Vr resulting in an increase of frequency of operation and a lower frequency of operation for a lower value of Vr.

To produce the control voltage for controlling the ramp generator, an integrated circuit type voltage regulator IC1 is used, such as a regulator Type 723. As is well known, such a voltage regulator has a terminal for a stable reference voltage. The regulator has two comparator input terminals 4 and 5. To terminal 4 is applied a reference voltage obtained from the voltage at terminal 6 by a resistor R18 and to the other terminal 5 is applied a voltage from the positive output terminal 13, by a potential divider consisting of resistors R6 and R7

At its output terminal 11 the regulator will produce a voltage which is proportional to the difference between the voltages at its input terminals 4 and 5. The regulator receives a unidirectional supply voltage +V1 from a supply conductor fed from a small voltage supply unit S, fed from the input alternating voltage at terminals 10.

The voltage at the ramp generator supply conductor Vr is derived from the voltage at the supply conductor +V1 through a control transistor Tr5. The base of the transistor is normally at a voltage obtained from potential divider R8, R9 connected to conductor +V1 and the voltage at the ouput of the regulator is fed to the junction point J7 of the two resistors R8 and R9. Transistor Tr5 thus controls the current fed to the ramp generator stage and so controls the frequency of operation. Output from the ramp generator is taken from the collectors of transistors Tr3 and Tr4; the output voltages are supplied to the bases of further transistors Tr6 and Tr7 respectively, which have collector resistors R10 and R11 fed from the conductor +V1. The collectors of transistors Tr6 and Tr7 are connected respectively to the bases of two further transistors Tr8 and Tr9, which have collector resistors R12 and R13 fed from the conductor +V1.

Transistors Tr6 to Tr9 thus act as power amplifying stages, and the output, taken from the collectors of transistors Tr8 and Tr9, is fed to a further winding T1d on transformer T1.

The ramp generator is designed so that there is a transitional state of the transistors such that transistors Tr8 and Tr9 in the operating cycle are both conductive for a short period, and thereby present an effective short circuit on the winding T1d of transformer T1. If this short circuit occurs during the time that, for example, transistor Tr1 is conducting, then the flux linkage between winding T1c and widning T1a will be ineffective and the current flow in winding T1a will cease, causing transistor Tr1 to turn off and become non-conductive. It is arranged that the frequency of operation of the ramp generator is somewhat higher than the natural frequency of operation of the oscillatory circuit including the transformer T1 and transistors Tr1 and Tr2 so that the operation of this circuit is susceptible to control by the ramp generator in this way. The frequency of the oscillating circuit is thus controlled by the frequency of the ramp generator, in turn controlled by the output voltage of the converter.

When supply voltage is first applied to the circuit or at very low output load currents there is insufficient current in winding T1c for the self-oscillatory action of Tr1, Tr2 and T1 to take place and under these conditions Tr8 and Tr9 provide sufficient drive current to turn Tr1 and Tr2 on and off in the manner of a driven converter. The bleed resistor R1 across the filter capacitor C4 provides a small output current at no load conditions to maintain stability around the negative feedback loop.

The circuit can also be made current sensitive and it is for this purpose that transformer T3 is used. With this operation, when the maximum permitted current is being drawn from the converter, and the load conditions are such as to intend to increase the output current beyond this point, the frequency of the ramp generator is further increased, for the increasing load. By this means it can be arranged that the output current remains at a constant value and the output voltage drops for any increase in load above the permitted maximum. The current is sensed by transformer T3, feeding a rectifier BR2 of which the output is filtered by a capacitor C7 and a resistor R14. The rectified output voltage is applied to a potential divider comprising two resistors R15 and R16, and a proportion of the voltage is applied to the base of a transistor Tr10. The collector of Tr10 is connected through a resistor R17 to the junction point J7 and so contributes to the base voltage of transistor Tr5.

If the reflected current through the primary winding T2a of transformer T2 is constant then the time that the full supply voltage is applied across inductor L2 is constant. Hence, the output voltage is proportional to the voltage time integral remaining in each switching cycle and by increasing the frequency the output voltage will decrease, thus providing a constant current output up to the point where short circuit conditions exist at the output terminals 13.

Figure 3:
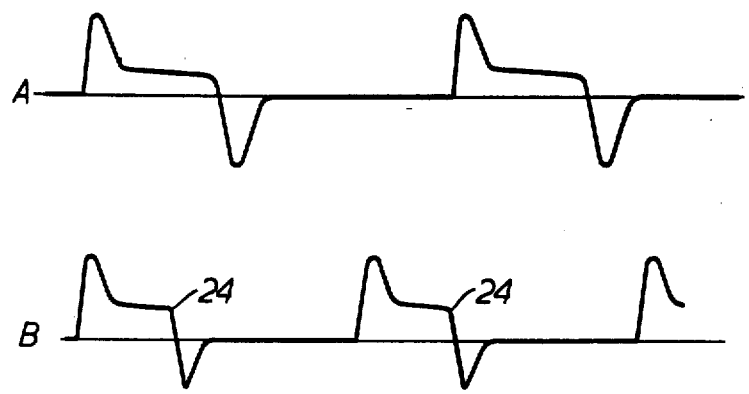

FIG. 3A shows the current flowing in winding T1a of transformer T1 under natural frequency conditions and FIG. 3B shows the corresponding waveform when the current flow is curtailed by the application at the instants 24 of a short circuit to the winding T1d.

Figure 4:
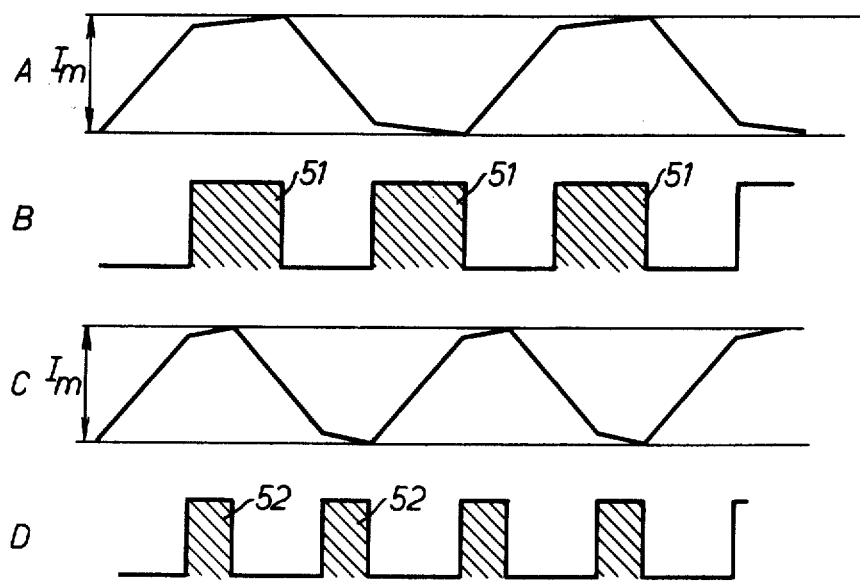

FIG. 4 illustrates the operation of the current action resulting from an increase in cyclic frequency with constant maximum current in the primary winding of the converter transformer. Waveform A of FIG. 4 shows the variation with time of the current flowing in the primary winding T2a of converter transformer T2, the excursion of this current being limited to a value Im, when the system is operating at a first frequency $f_1$. Waveform B illustrates the resultant voltage appearing between points J5 and J6 of FIG. 1, the sum of the voltage-time integrals represented by the shaded areas 51 representing the available output from the converter.

Waveform C of FIG. 4 illustrates the current in T2a when operating at a frequency higher than $f_1$, with the excursion again limited to Im. The resultant voltage at J5, J6, shown in waveform D shows how the voltage-time integral represented by shaded areas 52 is reduced as compared with waveform B, so that the output current is appropriately limited.

The circuit shown in FIG. 1 is a so-called half-bridge converter. The same control methods can be applied to other known forms of converter such as push-pull and full bridge types.

Values of components suitable for use in the embodiment of FIG. 1 are given below:

| Transistors | | Resistors | |
|---|---|---|---|
| Tr1 | ⎫ BDY 93 | R1- | 120 ohms |
| Tr2 | ⎭ | R2 | ⎫ 1 kilohms |
| Tr3, Tr4 | ⎫ 2N2369 | R3 | ⎭ |
| Tr6-Tr9 | ⎭ | R4 | ⎫ 5.6 kilohms |
| Tr5 | | R5 | ⎭ |
| Tr10 | BC 187 | | |
| Diodes | | R6- | 15 kilohms |
| D1 | ⎫ 1N5402 | R7- | 7.5 kilohms |
| D2 | ⎭ | R8- | 6.2 kilohms |
| D3 | ⎫ BXY 61 | R9- | 56 kilohms |
| D4 | ⎭ | R10- | ⎫ 2 kilohms |
| D5 | | R11 | ⎭ |
| Capacitors | | R12 | ⎫ 1 kilohm |
| C1- C2 | 470 μF | R13 | ⎭ |
| | | R14- | 510 ohms |

-continued

|  |  |  |  |
|---|---|---|---|
| C3 | } 1 µF | R15- | 5.6 kilohms |
| C4- | 2200 µF | R16- | 560 ohms |
| C5 | } 2.2 nF | R17- | 6.2 kilohms |
| C6 |  | R18- | 4.7 kilohms |
| C7- | 1. µF | R19- | 47 kilohms |
| C8- | 0.1 µF | R20- | 20 kilohms |

Transformer T1 turns ratios 5:5:1:30 for windings T1a:T1b:T1c:T1d

Inductance L2≑30 µH at 25 KHz.

What is claimed is:

1. In a voltage converter system including
   (a) switching circuit means including a pair of switching devices (Tr1, Tr2) connected with a unidirectional voltage source, each of said switching devices including a control terminal and being alternately operable between conducting and non-conducting conditions;
   (b) converter transformer means (T1) for cyclically operating said switching devices between opposite conducting and non-conducting conditions, respectively, said converter transformer means including a pair of switching windings (T1a, T1b) connected with the control terminals of said switching devices, respectively said converter transformer means also including a load winding (T1c); and
   (c) load circuit means for connecting said load winding with a pair of output terminals (13) adapted for connection with a load, whereby a periodically inverted voltage is produced across said load winding, said load circuit means including a load current path in which said load winding is connected in series, whereby the reflected load current flowing in said load current path and said load winding induces a corresponding voltage in that switching winding which is associated with the switching device that is conductive at a given time;
   the improvement which comprises regulating means for maintaining the output voltage appearing across said output terminals at a regulated value, said regulating means including
   (d) means in said load circuit means defining an inductance in series with said load winding, whereby owing to the rate of change characteristic of said inductance defining means, a variation in the reflected load current flowing through said load winding produces a corresponding change in the leading portion of the inductance current waveform, thereby to produce an opposite variation in the trailing waveform portion and in the complementary output voltage appearing across said output terminals; and
   (e) means for varying the switching operation of said switching devices, said converter transformer means further including a control winding (T1d) magnetically coupled with said switching and load windings, said switching operation varying means including
      (1) drive pulse generating means (Tr3, Tr4) for supplying drive pulses to said control winding to induce voltages in said switching windings for operating said switching devices between their conductive and non-conductive conditions, respectively; and
      (2) short circuit means (Tr8, Tr9) for short circuiting said control winding to control the instants of switching of said switching devices.

2. Apparatus as defined in claim 1, wherein said inductance defining means comprises an inductor (L2).

3. Apparatus as defined in claim 1, wherein said inductance defining means comprises an output transformer (T2) having primary winding (T2a) connected in series with said load winding; said output transformer having a secondary winding (T2b, T2c) connected with said load terminals, the leakage reactance losses of said output transformer constituting said inductance means.

4. Apparatus as defined in claim 1, wherein said drive pulse generator means comprises a voltage controlled oscillator the frequency of operation of which is a function of control voltage.

5. Apparatus as defined in claim 4, and further including means (R6, R7) for varying the control voltage of said oscillator as a function of the voltage appearing across said output terminals.

6. Apparatus as defined in claim 4, and further including means for varying the control voltage of said oscillator as a function of the current flowing through said load winding.

7. Apparatus as defined in claim 6, wherein control voltage varying means comprises:
   (1) a sensing transformer (T3) having a primary winding connected in series with said converter transformer load winding, said sensing winding also having a secondary winding;
   (2) rectifier means (BR2) for rectifying the secondary voltage appearing in the secondary winding of said sensing transformer, thereby to obtain a unidirectional control voltage; and
   (3) means for applying said unidirectional control voltage control means.

8. Apparatus as defined in claim 7, wherein said unidirectional control voltage applying means comprises
   (a) a modifying transistor (Tr10) having a collector-emitter path, and a base electrode to which said unidirectional control voltage is applied;
   (b) voltage divider means (R8, R9) a central portion of which is connected with the voltage control means of said oscillator; and
   (c) a resistor (R17) connecting said collector-emitter path to the central portion of said voltage divider means.

9. Apparatus as defined in claim 1, wherein said converter transformer is a saturable transformer, said switching devices comprising a pair of transistors each having base and emitter electrodes across which the associated switching winding is connected.

10. Apparatus as defined in claim 9, wherein said transistors are connected in series across said unidirectional voltage souce, and further including a pair of capacitors (C2, C3) connected in series across said unidirectional voltage source.

* * * * *